(12) United States Patent
Shin et al.

(10) Patent No.: US 10,455,530 B2
(45) Date of Patent: Oct. 22, 2019

(54) METHOD FOR TRANSMITTING AND RECEIVING SYNCHRONIZATION SIGNAL IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/755,220

(22) PCT Filed: Sep. 2, 2016

(86) PCT No.: PCT/KR2016/009864
§ 371 (c)(1),
(2) Date: Feb. 26, 2018

(87) PCT Pub. No.: WO2017/039397
PCT Pub. Date: Mar. 9, 2017

(65) Prior Publication Data
US 2018/0249433 A1 Aug. 30, 2018

Related U.S. Application Data

(60) Provisional application No. 62/213,636, filed on Sep. 3, 2015, provisional application No. 62/215,037, filed on Sep. 7, 2015.

(51) Int. Cl.
*H04W 56/00* (2009.01)
*H04W 72/04* (2009.01)
(Continued)

(52) U.S. Cl.
CPC ....... *H04W 56/0005* (2013.01); *H04L 5/0005* (2013.01); *H04L 5/0048* (2013.01);
(Continued)

(58) Field of Classification Search
CPC .......... H04W 56/0005; H04W 72/0446; H04L 5/0005; H04L 5/0048; H04L 27/0014;
(Continued)

(56) References Cited

U.S. PATENT DOCUMENTS

2011/0103406 A1* 5/2011 Cai ....................... H04L 5/0044
370/480
2012/0269201 A1 10/2012 Atungsiri et al.
(Continued)

FOREIGN PATENT DOCUMENTS

KR 10-2010-0106364 A 10/2010
KR 10-2015-0037888 A 4/2015
(Continued)

*Primary Examiner* — Ajay Cattungal
(74) *Attorney, Agent, or Firm* — Dentons US LLP

(57) ABSTRACT

The present specification provides a method for transmitting and receiving a synchronization signal by a terminal in a wireless communication system, the method comprising the steps of: receiving broadcast information through a predetermined frame from a base station, wherein the predetermined frame is a frame defined for transmitting and receiving a signal in a narrow band (NB) and includes at least one first subframe; and receiving the synchronization signal from the base station through one or more first subframes on the basis of the received broadcasting information.

14 Claims, 15 Drawing Sheets

(51) Int. Cl.
*H04L 5/00* (2006.01)
*H04L 27/00* (2006.01)
*H04L 27/26* (2006.01)

(52) U.S. Cl.
CPC ...... *H04L 27/0014* (2013.01); *H04L 27/2613* (2013.01); *H04L 27/2692* (2013.01); *H04W 72/0446* (2013.01); *H04L 27/2607* (2013.01)

(58) Field of Classification Search
CPC ............ H04L 27/2613; H04L 27/2692; H04L 27/2607
See application file for complete search history.

(56) References Cited

U.S. PATENT DOCUMENTS

| | | | |
|---|---|---|---|
| 2015/0180629 A1* | 6/2015 | Lorca Hernando | H04J 11/00 370/330 |
| 2017/0064685 A1* | 3/2017 | Rico Alvarino | H04B 7/0456 |
| 2017/0279646 A1* | 9/2017 | Yi | H04L 5/0053 |

FOREIGN PATENT DOCUMENTS

| | | |
|---|---|---|
| WO | 2013/129884 A1 | 9/2013 |
| WO | 2013/133681 A1 | 9/2013 |

\* cited by examiner

【Figure 1】
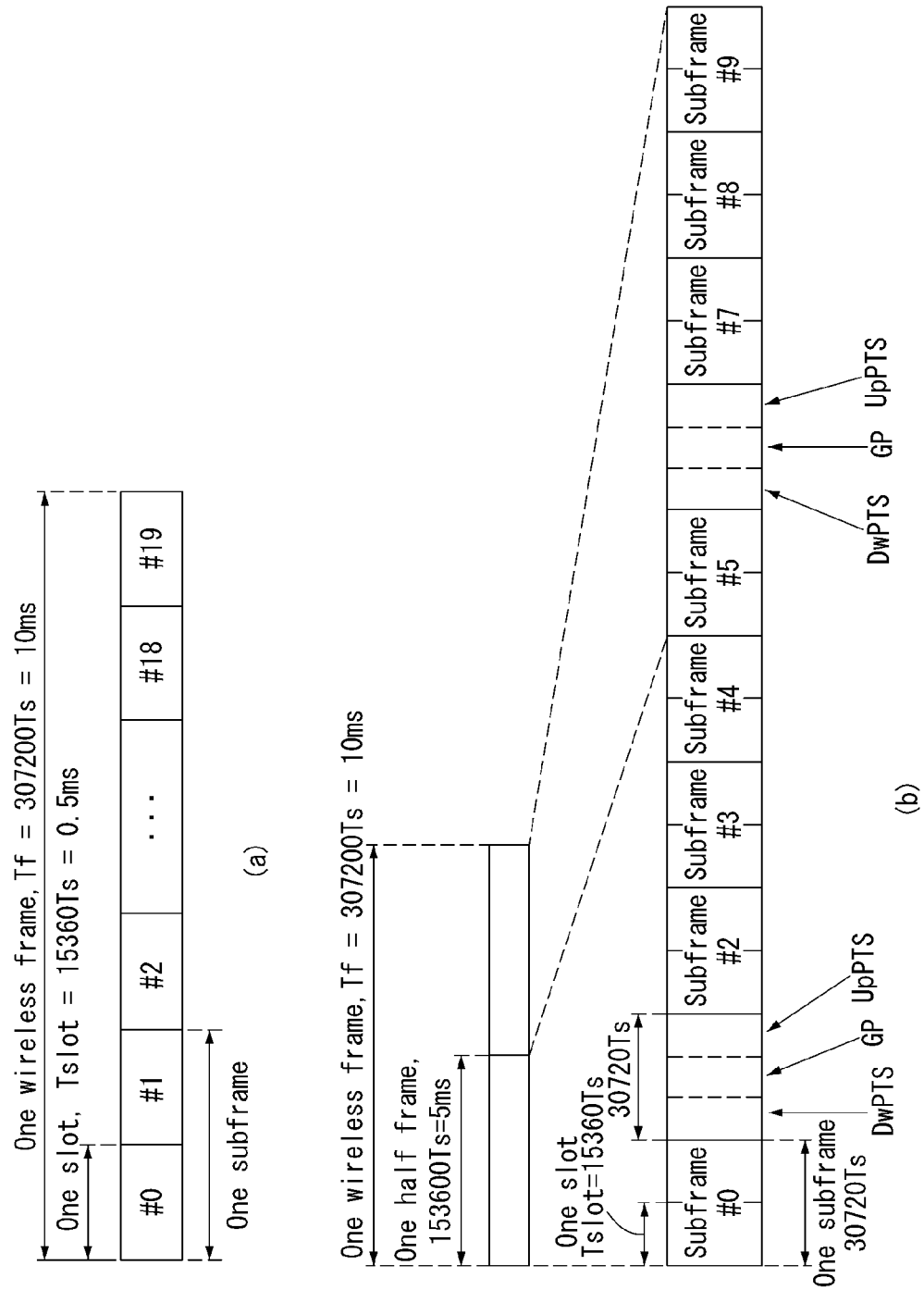

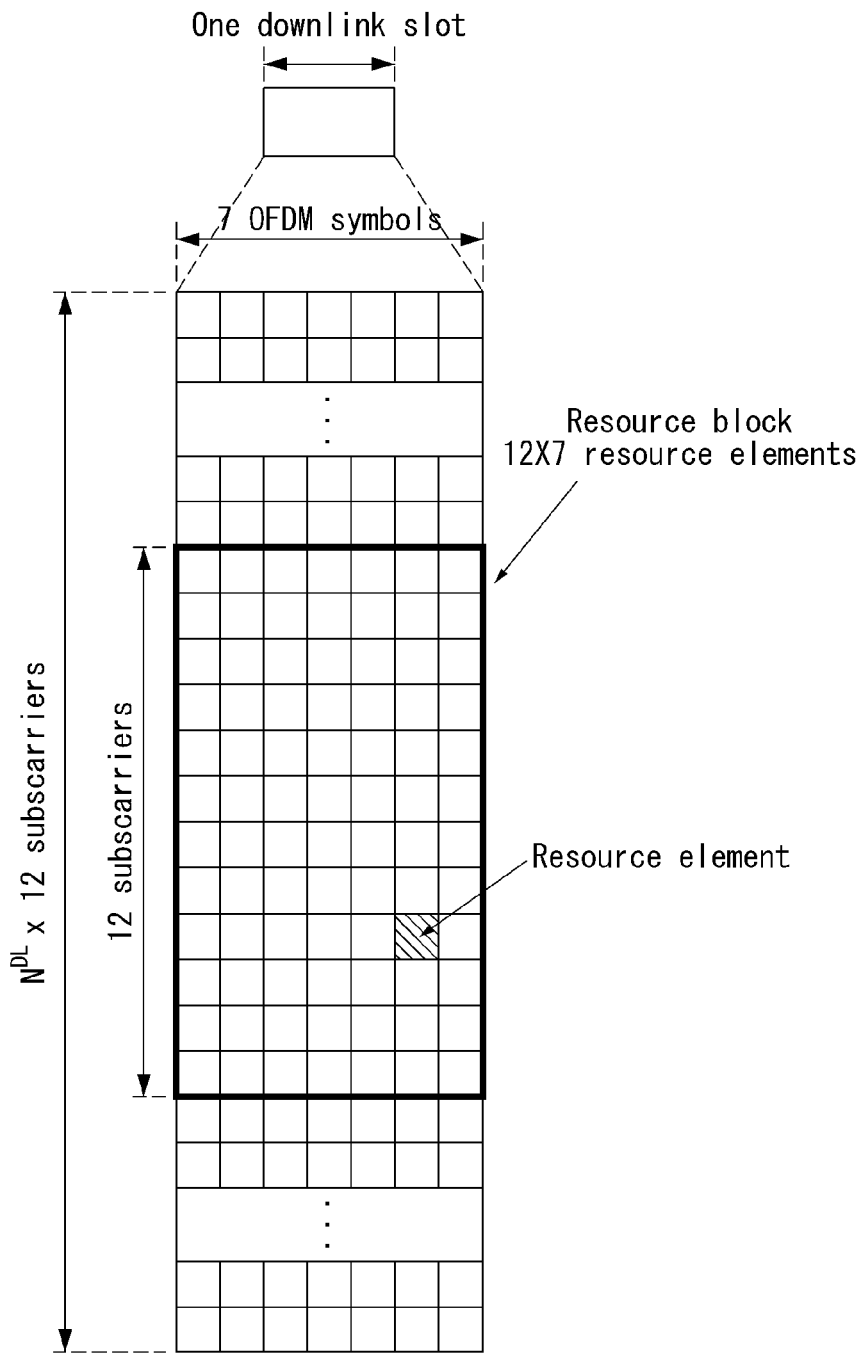

[Figure 3]
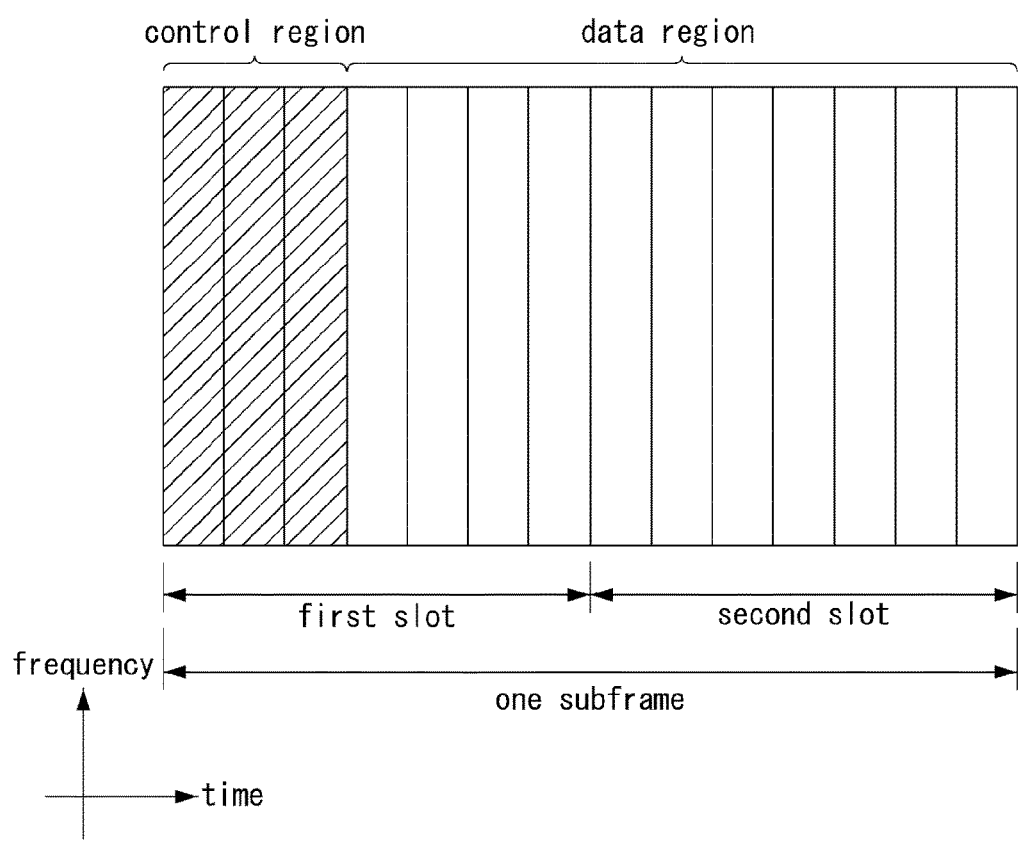

[Figure 4]
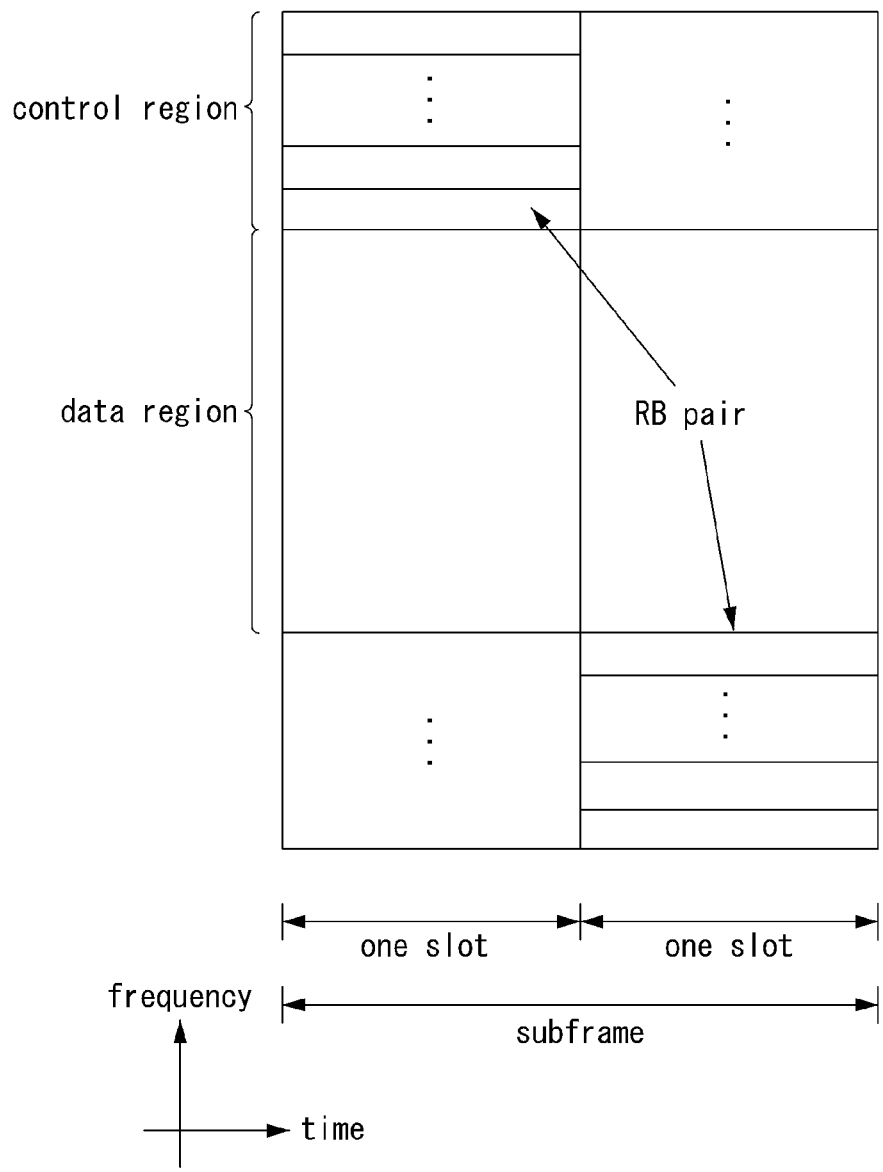

[Figure 5]
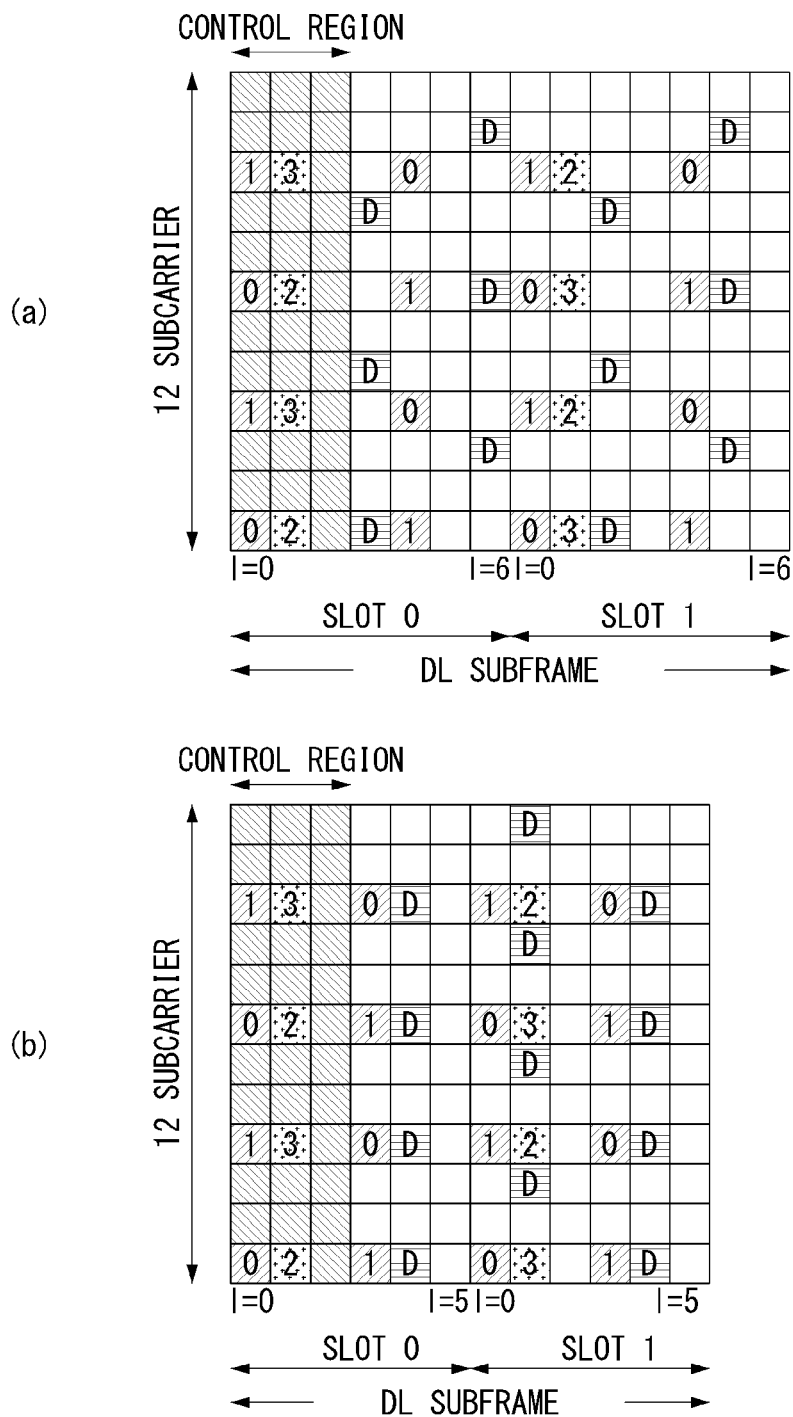

[Figure 6]
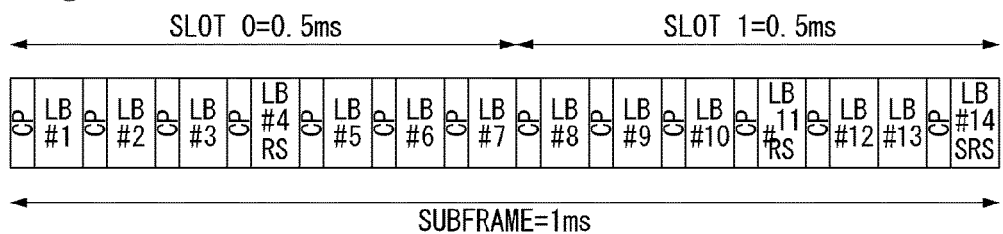
[Figure 7]
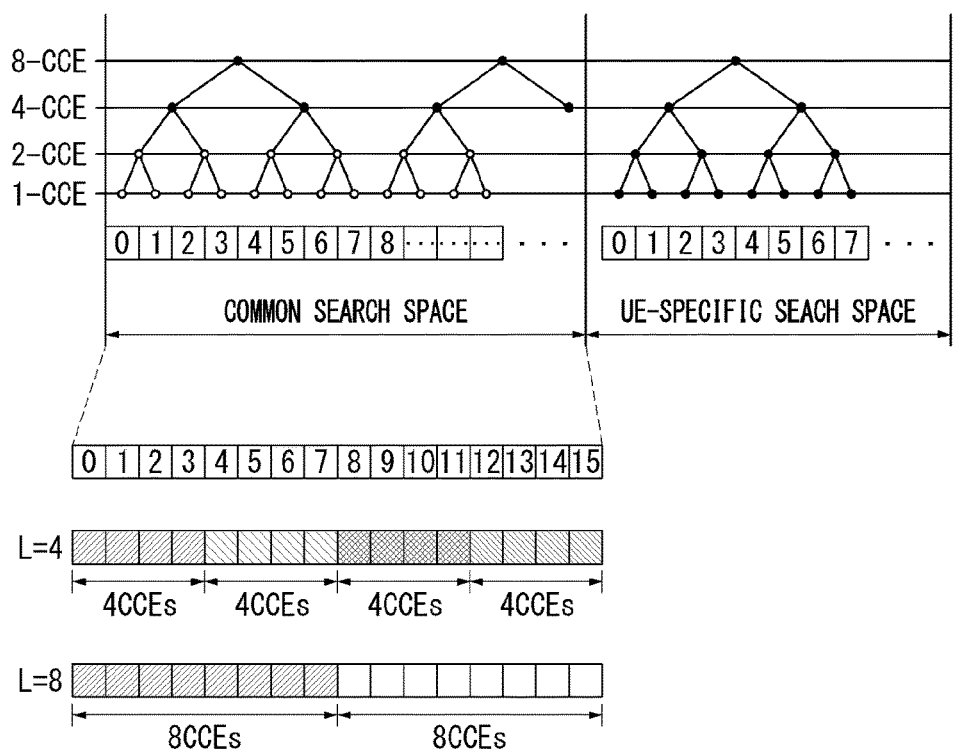

[Figure 8]
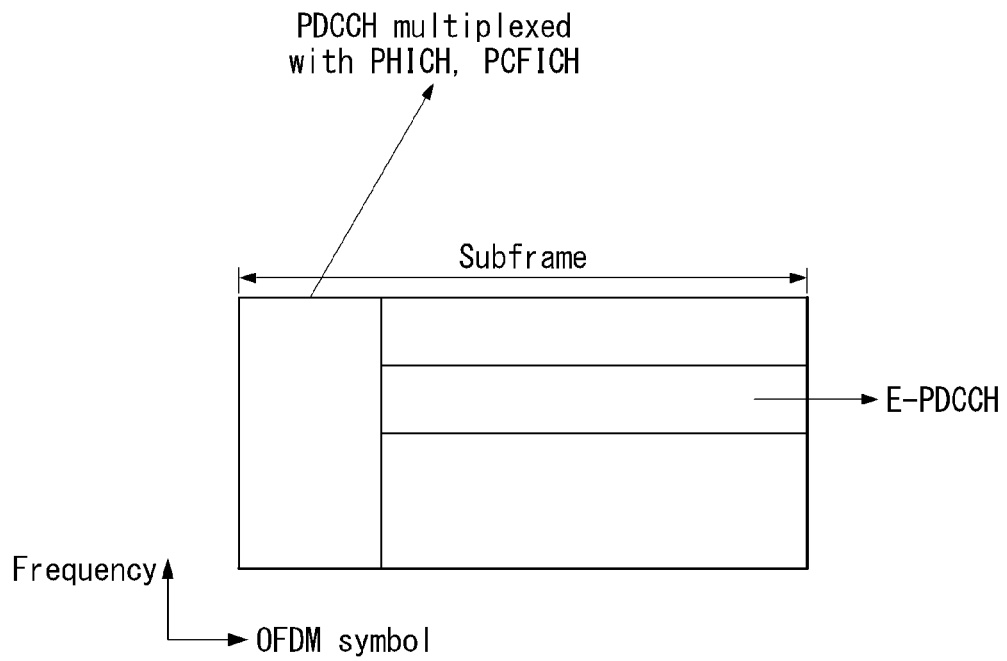
[Figure 9]
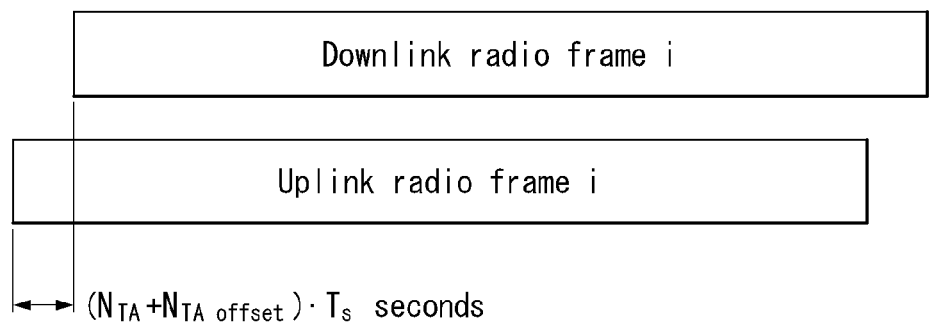

【Figure 10】
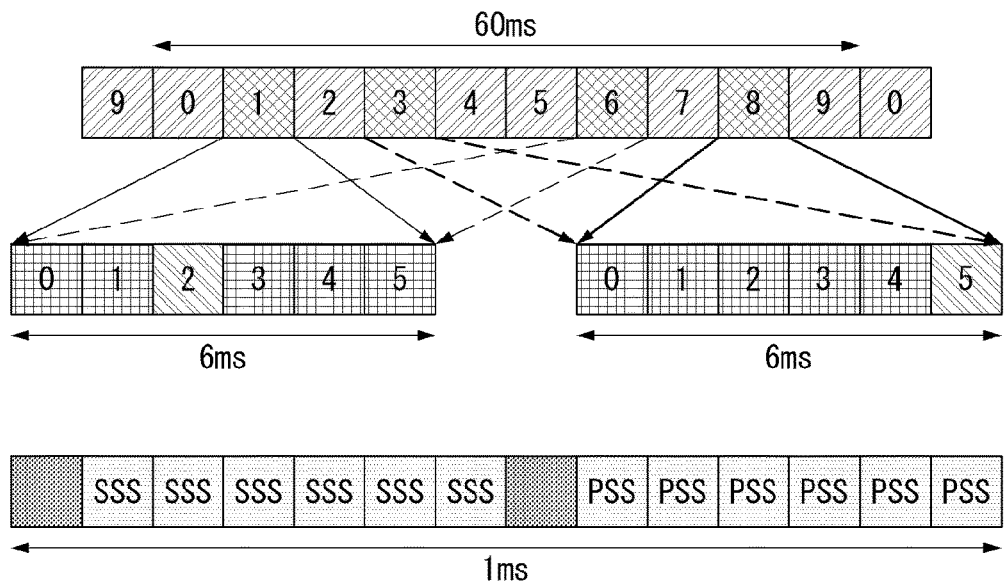
【Figure 11】
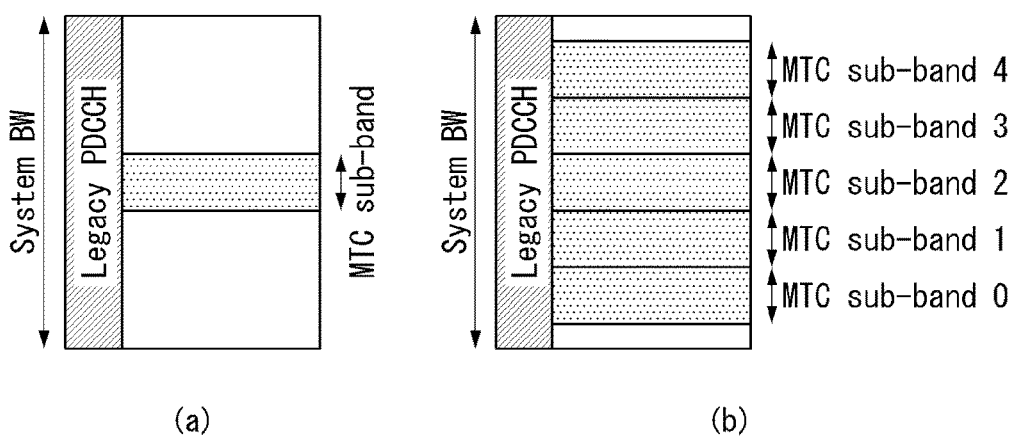
(a)                    (b)

[Figure 12]
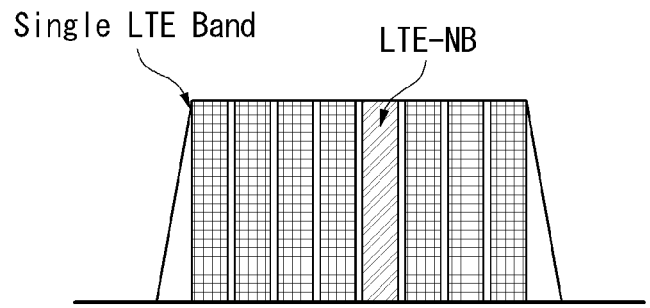
(a) In-band system
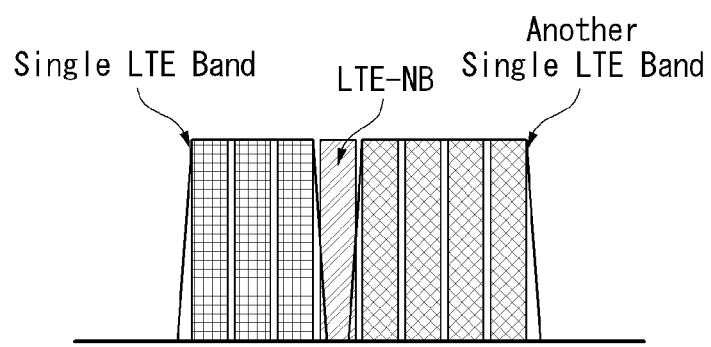
(b) Guard-band system
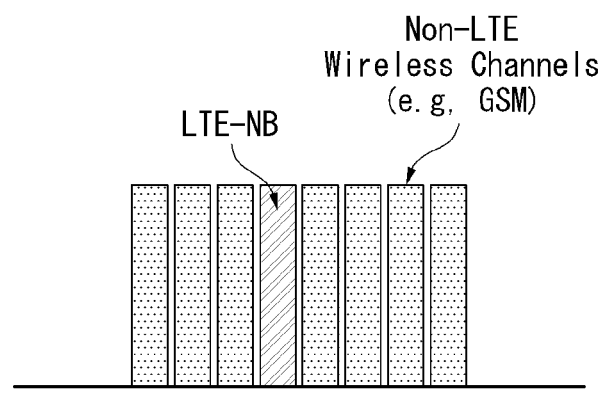
(c) Stand-alone system 【Figure 13】
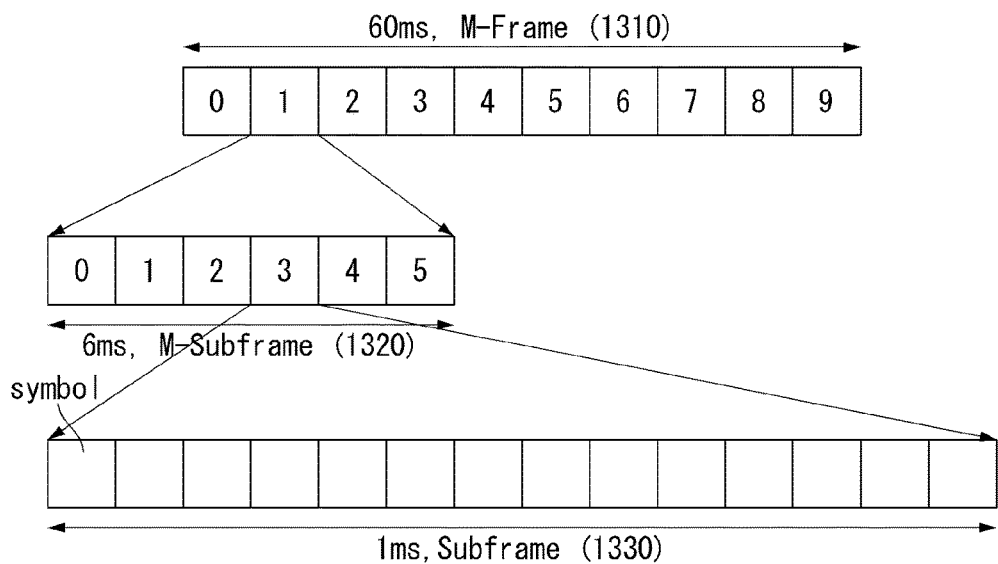
【Figure 14】
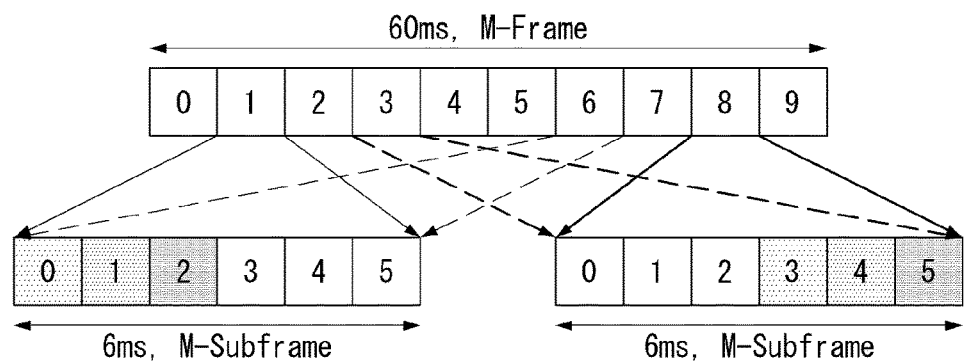

【Figure 15】
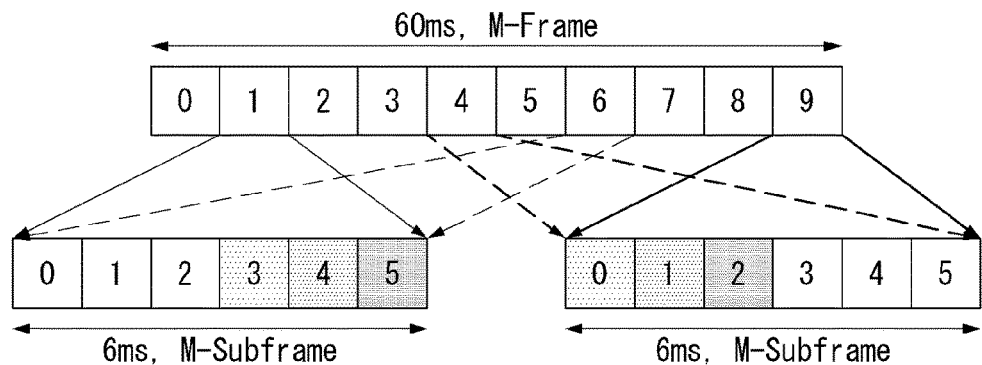
【Figure 16】
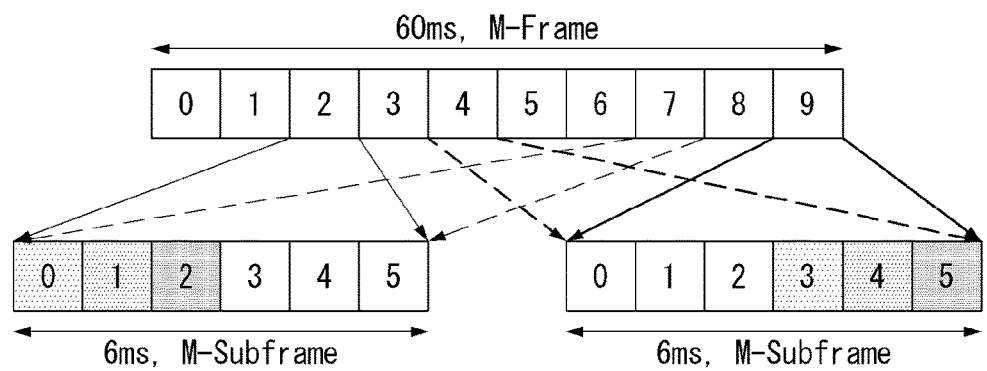
【Figure 17】
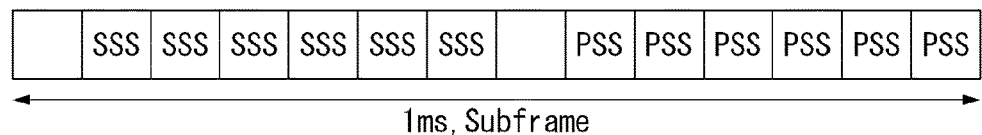

[Figure 18]
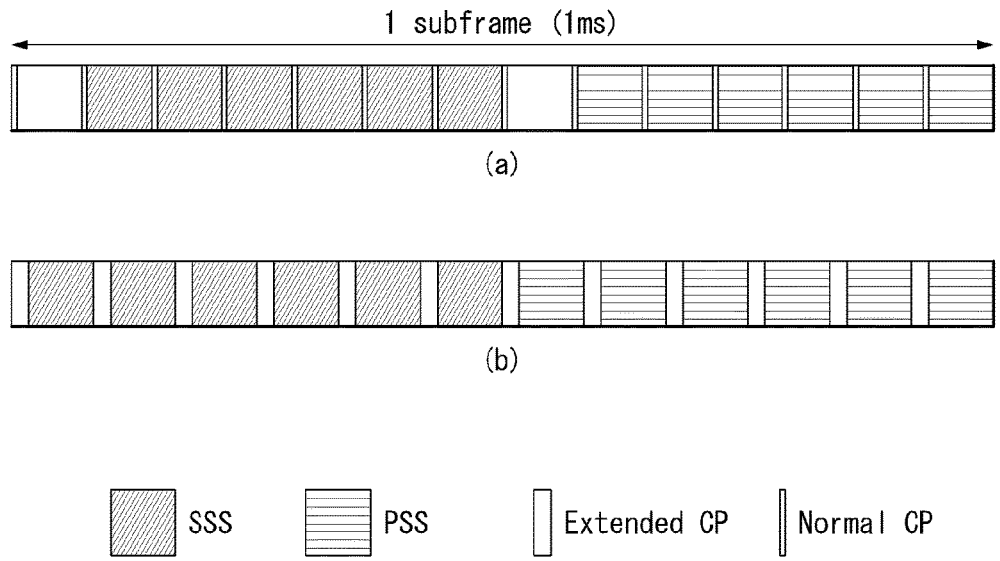
[Figure 19]
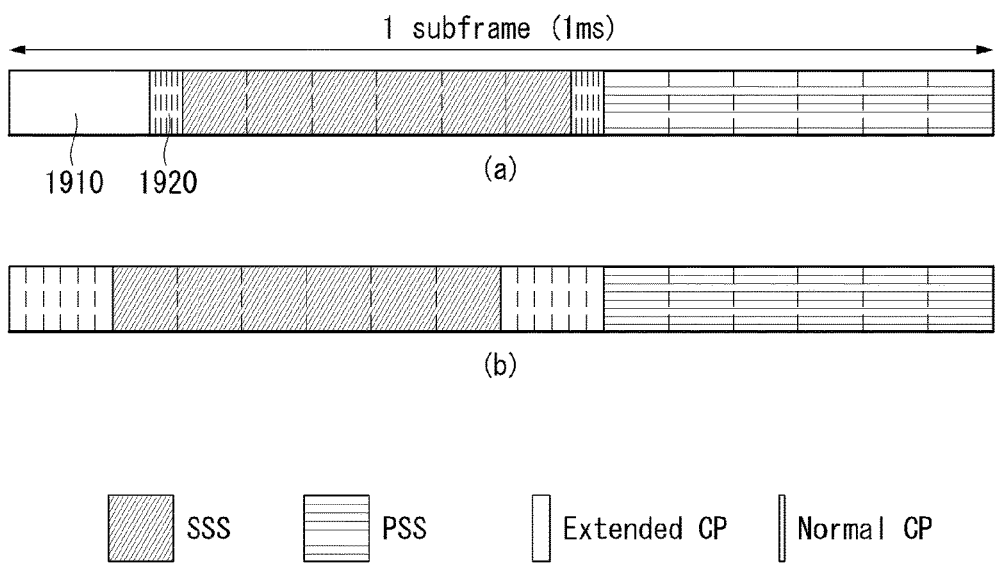

【Figure 20】
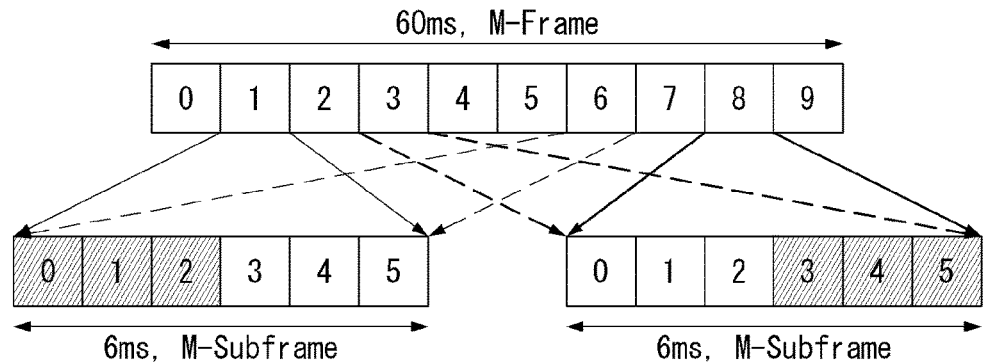
【Figure 21】
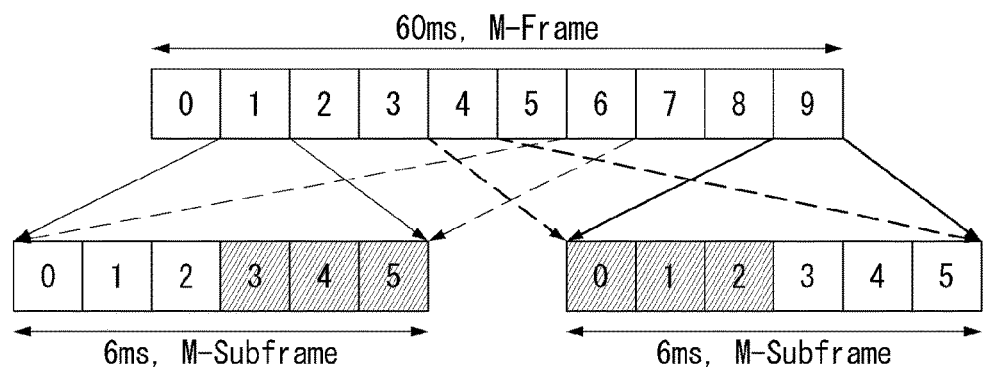
【Figure 22】
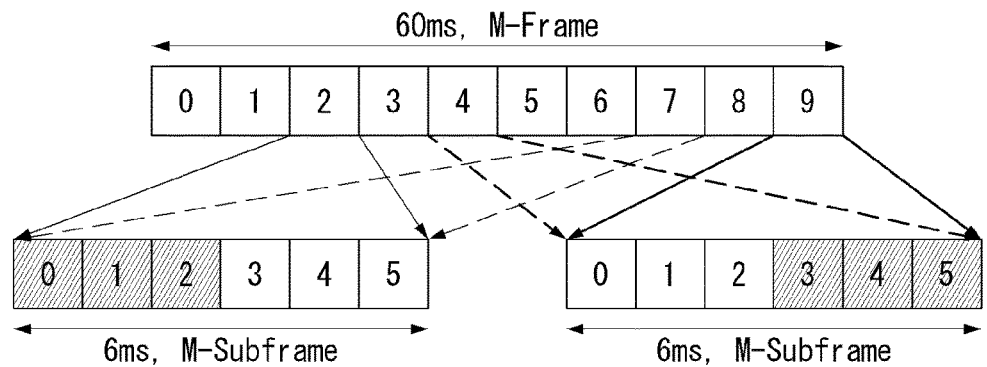

[Figure 23]
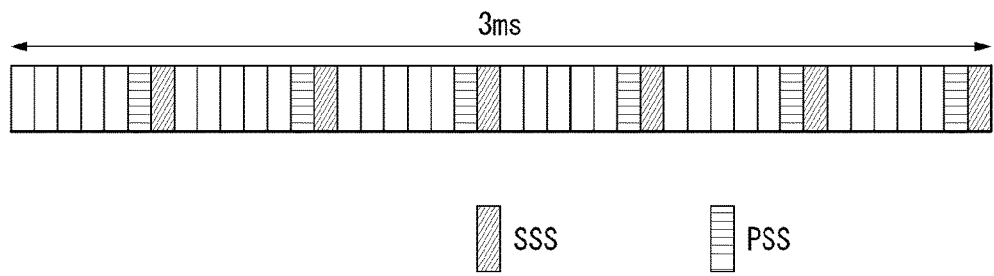
[Figure 24]
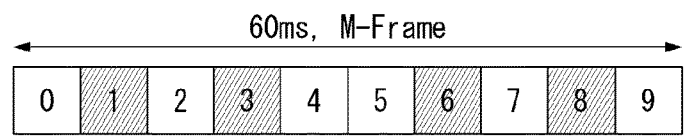
[Figure 25]
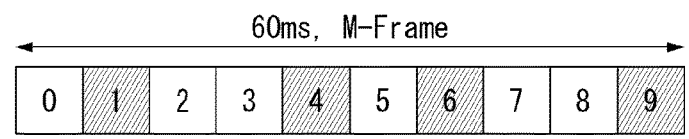
[Figure 26]
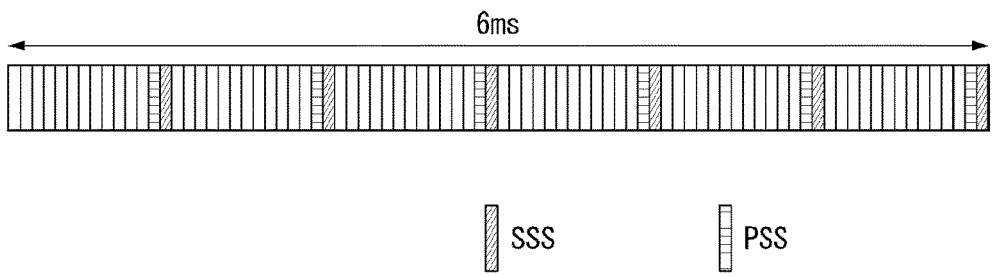

[Figure 27]
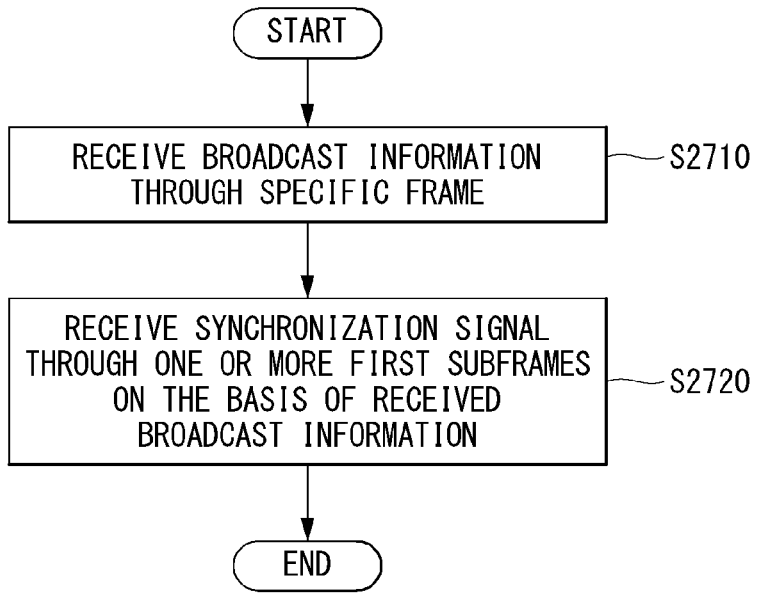
[Figure 28]
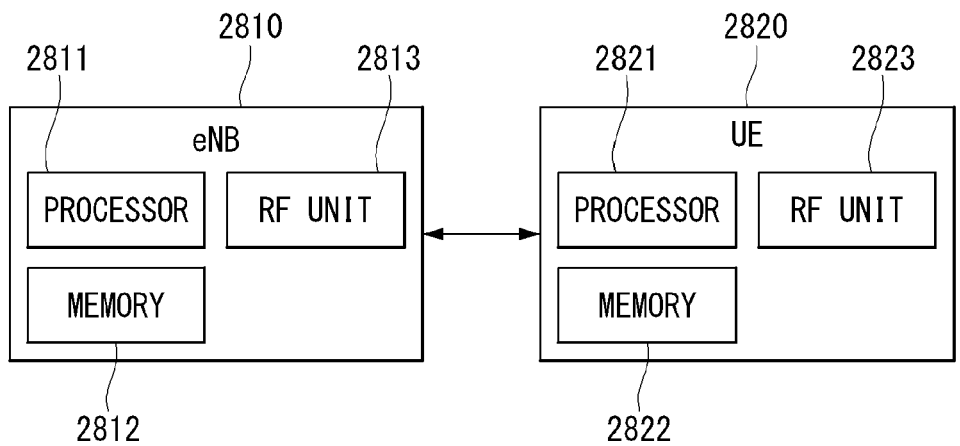

METHOD FOR TRANSMITTING AND RECEIVING SYNCHRONIZATION SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/009864, filed on Sep. 2, 2016, which claims the benefit of U.S. Provisional Application No. 62/213,636, filed on Sep. 3, 2015 and U.S. Provisional Application No. 62/215,037, filed on Sep. 7, 2015, the contents of which are all hereby incorporated by reference herein in their entirety.

TECHNICAL FIELD

The present invention relates to a wireless communication system, and more particularly, to a method for transmitting and receiving a synchronization signal in a narrow band (NB) and an apparatus for supporting the same.

BACKGROUND ART

A mobile communication system has been developed to provide a voice service, while ensuring the user's activity. However, the mobile communication system has expanded the scope to a data service, as well as the voice service, and currently, explosive increase in traffic has caused shortage of resource and, as users request higher speed services, a more advanced mobile communication system is required.

The requirements of a next generation mobile communication system are required to support acceptance of explosive data traffic, a significant increase in a data rate per user, acceptance of a significantly increased number of connected devices, very low end-to-end latency, and high energy efficiency. To this end, various technologies such as dual-connectivity, massive multiple input multiple output (MIMO), in-band full duplex, non-orthogonal multiple access (NOMA), support of super-wideband, device networking, and the like, have been researched.

DISCLOSURE

Technical Problem

An aspect of the present invention is to define a new frame structure capable of transmitting and receiving a signal in a narrow band (NB) for a low-cost/low-specification terminal.

Another aspect of the present invention is to provide a method for transmitting synchronization signals (PSS and SSS) in a newly defined frame structure.

Another aspect of the present invention to provide a method of transmitting a synchronization signal for efficient CP length detection of a terminal in a newly defined frame structure.

Technical subjects obtainable from the present invention are not limited by the above-mentioned technical task and other unmentioned technical tasks may be clearly understood from the following description by those having ordinary skill in the art to which the present invention pertains.

Technical Solution

According to an aspect of the present invention, there is provided a method for transmitting and receiving a synchronization signal by a user equipment (UE) in a wireless communication system includes: receiving broadcast information through a specific frame from a base station (BS), the specific frame being a frame defined for transmitting and receiving a signal in a narrow band (NB), the specific frame including at least one first subframe, the first subframe including at least one second subframe, and the second subframe including at least one symbol; and receiving the synchronization signal from the BS through one or more first subframes on the basis of the received broadcast information.

Also, in this disclosure, the narrow band may be a frequency band of 200 KHz.

Also, in this disclosure, the narrow band of 200 KHz may include a guard band.

Also, in this disclosure, the synchronization signal may include a first synchronization signal and a second synchronization signal, and the receiving of the synchronization signal may include: receiving the first synchronization signal through a first symbol set of the second subframe; and receiving the second synchronization signal through a second symbol set of the second subframe.

Also, in this disclosure, the first symbol set and the second symbol set may each include at least one symbol.

Also, in this disclosure, the second symbol set may be located before the first symbol set.

Also, in this disclosure, the narrow band may not use the same frequency band as that of a legacy LTE system.

Also, in this disclosure, the first symbol set and the second symbol set may each include one symbol, and the second subframe may include two normal cyclic prefixes (CPs), one second symbol set, and one first symbol set.

Also, in this disclosure, a symbol duration of the first symbol set may be six times a symbol duration of the legacy LTE system.

Also, in this disclosure, a subcarrier spacing in the narrow band may be ⅙ times a subcarrier spacing of the legacy LTE system.

Also, in this disclosure, the two normal CPs may be located before the first symbol set and the second symbol set, respectively, and the second symbol set may be located immediately before a normal CP located before the first symbol set.

Also, in this disclosure, the specific frame may be an M-frame, the first subframe may be an M-subframe, and the second subframe may correspond to a subframe of the legacy LTE system.

According to another aspect of the present invention, there is provided a user equipment (UE) for transmitting and receiving a synchronization signal in a wireless communication system includes: a radio frequency (RF) unit transmitting and receiving a radio signal; and a processor controlling the RF unit, wherein the processor performs control to receive broadcast information through a specific frame from a base station (BS), wherein the specific frame is a frame defined for transmitting and receiving a signal in a narrow band (NB), the specific frame includes at least one first subframe, the first subframe includes at least one second subframe, and the second subframe includes at least one symbol, and receive the synchronization signal from the BS through one or more first subframes on the basis of the received broadcast information.

Advantageous Effects

In this disclosure, by defining a new frame structure for a low-priced/low specification terminal, a sequence of a synchronization signal used in an existing legacy system may be used without having to newly define a sequence of a synchronization signal to be transmitted and received in a narrow band.

Further, in the present disclosure, by reducing a sub-carrier interval in a narrow band by an integral multiple of a sub-carrier interval in the legacy system, a terminal may efficiently detect a CP length even in a newly defined frame structure.

It will be appreciated by a person skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

The accompanying drawings, which are included to provide a further understanding of the invention and are incorporated in and constitute a part of the specification, illustrate embodiments of the invention and, together with the description, serve to explain the technical features of the invention.

FIG. 1 is a diagram illustrating a structure of a radio frame in a wireless communication system to which the present invention may be applied.

FIG. 2 is a diagram illustrating a resource grid for one downlink slot in a wireless communication system to which the present invention may be applied.

FIG. 3 is a diagram illustrating a structure of a downlink subframe in a wireless communication system to which the present invention may be applied.

FIG. 4 is a diagram illustrating a structure of an uplink subframe in a wireless communication system to which the present invention may be applied.

FIG. 5 is a diagram illustrating a reference signal pattern mapped to a downlink resource block pair in a wireless communication system to which the present invention may be applied.

FIG. 6 is a diagram illustrating an uplink subframe including a sounding reference signal symbol in a wireless communication system to which the present invention may be applied.

FIG. 7 is a diagram illustrating monitoring of a PDCCH.

FIG. 8 is a diagram illustrating an example of a resource region of an E-PDCCH.

FIG. 9 is a diagram illustrating an example of an uplink-downlink timing relation.

FIG. 10 is a diagram illustrating an example of a frame structure for transmission of a PSS and an SSS.

FIG. 11 is a diagram illustrating an example of a system band in which an MTC UE to which a method proposed in this disclosure may be applied operates.

FIG. 12 is a diagram illustrating an example of an operating system of an NB LTE system to which a method proposed in the present disclosure may be applied.

FIG. 13 is a diagram illustrating an example of a frame structure in an NB-LTE system proposed in the present disclosure.

FIGS. 14 to 16 are diagrams illustrating examples of a frame structure for transmission of a synchronization signal in an NB-LTE system proposed in the present disclosure.

FIG. 17 is a diagram illustrating an example of a subframe structure in which a synchronization signal is transmitted in the frame structure of FIGS. 14 to 16.

FIG. 18 is a diagram illustrating an example of a legacy subframe structure having a normal CP and an extended CP.

FIG. 19 is a diagram illustrating an example of a subframe structure for transmission of a synchronization signal in an NB-LTE system proposed in the present disclosure.

FIGS. 20 to 22 are diagrams illustrating another example of a frame structure for transmission of a synchronization signal proposed in the present disclosure.

FIG. 23 is a diagram illustrating an example of a subframe structure set for transmitting a synchronization signal using the frame structure of FIGS. 20 to 22 in a normal CP.

FIGS. 24 and 25 are diagrams illustrating another example of a frame structure for transmission of a synchronization signal proposed in this disclosure.

FIG. 26 is a diagram illustrating an example of a configuration of an M-subframe in which a synchronization signal is transmitted in a frame structure of FIGS. 24 and 25.

FIG. 27 is a flowchart illustrating an example of a method of transmitting a synchronization signal in a system using a narrow band proposed in this disclosure.

FIG. 28 is a block diagram illustrating a configuration of a wireless communication apparatus according to an embodiment of the present invention.

BEST MODES

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention may be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention may be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of continuous subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 illustrates he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe in a radio frame, 'D' represents a subframe for a downlink transmission, 'U' represent a subframe for an uplink transmission, 'S' represents a special subframe that includes three types, a Downlink Pilot Time Slot (DwPTS), a Guard Period (GP) and an Uplink Pilot Time Slot (UpPTS). There are seven types of uplink-downlink configurations and the position and/or number of downlink subframe, special subframe and uplink subframe are different for each configuration The time switched from downlink to uplink or the time switched from uplink to downlink is referred to as a switching point. The periodicity of the switching point means a period in which the phenomenon of unlink subframe and downlink subframe being switched is repeated in the same pattern, and both 5 ms and 10 ms are supported. In the case of a period of 5 ms downlink-uplink switching point, the special subframe(s) is existed in every half-frame, and in the case of a period of 10 ms downlink-uplink switching point, the special subframe(s) is existed in the first half-frame only.

For all configurations, 0th, fifth subframes and the DwPTS are durations only for a downlink transmission. The subframe directly following the UpPTS and subframe are durations for an uplink transmission always.

Such an uplink-downlink configuration is the system information, and may be known to a BS and a terminal. A BS may notify the change of the uplink-downlink allocation state of a radio frame by transmitting an index of configuration information only whenever the uplink-downlink configuration information is changed. In addition, the configuration information is a sort of downlink control information and may be transmitted through a Physical Downlink Control Channel (PDCCH) like other scheduling information, or it is the broadcast information and may be commonly transmitted to all terminals in a cell through a broadcast channel.

Table 2 represents a configuration (lengths of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure according to an example of FIG. 1 is just an example, but the number of subcarriers included in a radio frame, the number of slots included in a subframe or the number of OFDM symbols included in a slot may be changed in various manners.

FIG. 2 is a diagram illustrating a resource grid for one downlink slot in the wireless communication system to which the present invention may be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention may be applied.

Referring to FIG. 3, a maximum of three fore OFDM symbols in the first slot of the subframe is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention may be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmission end and the reception end and a method of detecting channel information using a degree of distortion when a signal is transmitted through a channel are largely used. The afore-mentioned signal is called a pilot signal or a reference signal (RS).

When a transmission end transmits and receives data using multiple input/output antennas, preferably, a channel state between a transmission antenna and a reception antenna is detected to allow a reception end to accurately receive data. here, in order for the reception end to detect a channel state, each transmission antenna of the transmission end preferably has an individual reference signal.

The downlink reference signal includes a common RS (CRS) shared by every terminal within a cell and a dedicated RS (DRS) used only for a specific terminal. The transmission end may provide information for demodulation and channel measurement to the reception end using the reference signals (CRS, DRS).

The reception end (i.e., UE) measures a channel state from the CRS, and feeds back an indicator related to channel quality such as a CQI (Channel Quality Indicator), a PMI (Precoding Matrix Index), and/or an RI (Rank Indicator) to the transmission end (i.e., BS). Meanwhile, an RS related to feedback of channel state information (CSI) may be defined as a CSI-RS.

The DRS may be transmitted through resource elements when data on a PDSCH is required to be demodulated. The UE may receive whether a DRS is present through a higher layer, and may be valid only when the corresponding PDSCH is mapped. The DRS may be called a UE-specific RS or a demodulation RS (DMRS).

FIG. 5 illustrates a reference signal pattern mapped to a downlink resource block pair in a wireless communication system to which the present invention may be applied.

A downlink resource block pair, that is, a unit in which a reference signal is mapped unit, may be represented in the form of one subframe in a time domain×12 subcarriers in a frequency domain. That is, in a time axis (i.e., x axis), one resource block pair has a length of 14 OFDM symbols in the case of a normal Cyclic Prefix (CP) (FIG. 5($a$)) and has a length of 12 OFDM symbols in the case of an extended CP (FIG. 5($b$)).

Referring to FIG. 5, in the resource block, Resource Elements (REs) indicated by "0", "1", "2", and "3" mean the positions of the CRSs of antenna port indices "0", "1", "2", and "3", and REs indicated by "D" denotes the position of a DRS.

Hereinafter, the CRS is described in detail below.

The CRS is a reference signal which can be commonly received by all the terminals located within a cell, and may be used for estimating a channel of a physical antenna. Also, the CRS may be used for channel quality information (CSI) and data demodulation.

The CRS may be defined in various formats according to antenna arrays in the transmission end (e.g., a BS). In the 3GPP LTE system (e.g., Rel-8/9), the transmission end may support up to 4 transmission antennas.

In case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

The DRS is described in more detail below. The DRS is used to demodulate data. Precoding weight used for a specific UE in MIMO antenna transmission is used without any change in order for a UE to estimate a corresponding channel in association with a transport channel transmitted in each transmission antenna when the UE receives a reference signal.

The 3GPP LTE system (e.g., Release-8) supports up to four transmission antennas, and a DRS for rank 1 beamforming is defined. The DRS for rank 1 beamforming further indicates a reference signal an antenna port index 5.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Thus, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

Antenna ports used here are p=15, p=15, 16, p=15, . . . , 18, p=15, . . . , 22. The CSI-RS may be defined only for the subcarrier interval $\Delta f=15$ kHz.

(k',l') (here, k' is a subcarrier index in a resource block and l' represents an OFDM symbol index in a slot) and the condition of n_s is determined according to the CSI-RS configuration illustrated in Table 3 or Table 4 below.

Table 3 illustrates mapping of (k',l') from the CSI-RS configuration in the normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates mapping of (k',l') from the CSI-RS configuration in the extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and n_s are determined according to the CSI-RS configuration, and a time-frequency resource that each CSI-RS antenna port uses for transmitting the CSI-RS is determined.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead can be provided according to a deployment scenario.

A sixteenth array completely turns off the switch of an SRS within a cell, which is mostly suitable for a serving cell which provides service to high-speed UEs.

FIG. 6 illustrates an uplink subframe including the symbols of a Sounding Reference Signal (SRS) in a wireless communication system to which the present invention may be applied.

Referring to FIG. 6, an SRS is always transmitted through the last SC-FDMA symbol in an arrayed subframe. Accordingly, an SRS and DMRS are placed in different SC-FDMA symbols.

The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other based on different base sequences allocated to respective cells, but orthogonality between the different base sequences is not guaranteed.

FIG. 7 is a diagram illustrating monitoring of a PDCCH

In the 3GPP LTE, blind decoding is used for detecting a PDCCH. The blind decoding is a scheme of identifying whether a PDCCH is its own control channel by demasking a desired identifier to a CRC (cyclic redundancy check) of a received PDCCH (referred to as a candidate PDCCH) to check a CRC error. The UE does not know which CCE aggregation level or DCI format is used to transmit its PDCCH in the control area.

A plurality of PDCCHs may be transmitted within one subframe. The UE monitors a plurality of PDCCHs in each subframe.

Here, monitoring refers to the UE attempting to decode a PDCCH according to a monitored PDCCH format.

In the 3GPP LTE, a search space is used to reduce a burden due to blind decoding. The search space may be a monitoring set of a CCE for a PDCCH. The UE monitors the PDCCH within the search space.

The search space is divided into a common search space and a UE-specific search space. The common search space is a space for searching PDCCHs having common control information. The common search space is composed of 16 CCEs ranging from CCE indices 0 to 15 and supports PDCCHs having a CCE aggregation level of {4, 8}. However, a PDCCH (DCI format 0, 1A) carrying UE-specific information may also be transmitted to the common search space. The UE-specific search space supports a PDCCH with the CCE aggregation level of {1, 2, 4, 8}.

TABLE 5

| Search Space Type | Aggregation Level (L) | Size (in CCEs) | Number of PDCCH candidates | DCI formats |
|---|---|---|---|---|
| UE-Specific | 1 | 6 | 6 | 0, 1, 1A, 1B, 1C, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A size of the search space is determined according to Table 5, and starting points of the common search space and the terminal-specific search space are defined to be different. The starting point of the common search space is fixed regardless of subframe. However, the starting point of the UE-specific search space may be varied for each subframe according to terminal identifier (for example, C-RNTI), a CCE aggregation level and/or a slut number within a radio frame. If the starting point of the UE-specific search space is within the common search space, the UE-specific search space and the common search space may overlap.

In the aggregation level L∈{1,2,3,4}, a search space $S^{(L)}_k$ is defined as an aggregation of PDCCH candidates. The CCE corresponding to the PDCCH candidate m in the search space $S^{(L)}_k$ is given as follows.

$$L \cdot \left\{(Y_k + m) \bmod \left\lfloor \frac{N_{CCE,k}}{L} \right\rfloor\right\} + i \qquad \text{[Equation 1]}$$

Here, i=0, 1, . . . , L−1, m=0, . . . , $M^{(L)}$−1, $N_{CCE,k}$ are a total number of CCEs available for transmission of the PDCCH within the control region of subframe k.

The control area includes an aggregation of CCEs numbered from 0 to $N_{CCE,k}$−1. $M^{(L)}$ is the number of PDCCH candidates at the CCE aggregation level L in a given search space. In the common search space, $Y_k$ is set to 0 for two aggregation levels, L=4 and L=8. In the UE-specific search space of the aggregation level L, the variable $Y_k$ is defined as follows.

$$Y_k = (A \cdot Y_{k-1}) \bmod D \qquad \text{[Equation 2]}$$

Here, $Y_{-1} = n_{RNTI} \neq 0$, A=39827, D=65537, k=floor($n_s$/2), $n_s$ is a slot number within a radio frame.

RRM-RS

A precoded RS may be transmitted and an RRM measurement may be performed on the precoded RS.

The precoded RS for this purpose will be referred to as 'RRM-RS'. The RRM-RS includes a plurality of antenna ports, and beamforming is configured to be different for each antenna port so that the UE may measure the RSRP for each transmission beam. For example, when the base station is capable of performing beamforming in M directions, an RRM-RS including the M ports is configured.

RRM-RS Period and Multiplexing

The M-port RRM-RS may be CDMed in the same subframe or transmitted separately by FDM/TDM. That is, when the transmission signals for each antenna port of the M-port RRM-RS are transmitted using different transmission REs in the same subframe or transmitted using the same RE, the transmission signals may be distinguished from each other without interference using orthogonal scrambling codes.

Alternatively, the number of antenna ports of the RRM-RS that may be simultaneously transmitted in one subframe may be set to K and may be transmitted by being divided into (M/K) number of subframes.

In this case, a setting parameter of the RRM-RS includes the number M of all antenna ports and the number K of antenna ports simultaneously transmitted in one subframe. The setting parameters of the RRM-RS include an RRM-RS transmission period P and an offset O. Here, the RRM-RS transmission period is defined as an interval of a subframe in which the RRM-RS is transmitted. For example, in the case of P=10, O=5, M=64, and K=32, the RRM-RS is transmitted in subframes with subframe indices (SFI) of 5, 15, 25, 35 . . . , and an RRM-RS of antenna ports 0 to 31 is transmitted in a subframe of SFI=5, an RRM-RS of antenna ports 32 to 64 is transmitted in a subframe of SFI=15, and an RRM-RS of the antenna ports 0 to 31 is transmitted again in a subframe of SFI=25.

Alternatively, in a method of defining an RRM-RS transmission period as an interval of a subframe in which an RS of the same antenna port is transmitted and dividedly transmitting the antenna ports of the RRM-RS in a (M/K) number of continuous subframes, RRM-RSs are dividedly transmitted in the (M/K) number of continuous subframes. For example, in the case of P=20, O=5, M=64, K=32, the RRM-RS is transmitted in a subframe with SFIs of 5, 6, 25, 26, 45, 46, and RRM-RS of antenna ports 0 to 31 is transmitted in subframe of SFI=5, the RRM-RS of antenna ports 32 to 63 is transmitted in subframe of SFI=6, and the RRM-RS of antenna ports 0 to 31 is again transmitted in subframe of SFI=25.

RSRP Measurement and Reporting

The RSRP of the RRM-RS is measured and reported for each antenna port. A plurality of RRM-RSs may be configured for the UE.

In case where each cell transmits one RRM-RS, the UE may be designated setup of RRM-RSs transmitted by a serving cell and a neighboring cell. One cell may transmit a plurality of RRM-RSs. When reporting an RSRP of the RRM-RS, the UE informs about an RSRP measurement result of the number of the antenna port of the RRM-RS.

In order to calculate the RSRP of the RRM-RS, received signal levels of the respective antenna ports are averaged, and here, the BS may designate a time window for averaging or received signal levels of the respective antenna ports are averaged for a predetermined time (e.g., 200 ms) to obtain an RSRP. Alternatively, the averaged reception power obtained in each time window may be filtered again to obtain the RSRP to report.

The UE having a plurality of configured RRM-RSs measures an RSRP for each antenna port of each RRM-RS. In case where R number of RRM-RS have been configured and the number of antenna ports of an rth RRM-RS is M_r, an RSRP of an mth antenna port of the rth RRM-RS is defined as RSRP(r,m). The UE aligns the RSRP(r,m) and selectively reports an RSRP of L number of antenna ports which are strongly received among them.

Slightly changing the aforementioned scheme, the UE aligns the RSRP(r,m), selects the most strongly received antenna port, and limitedly reports RSRPs of ports within a predetermined difference, compared with the RSRP of the selected antenna port, i.e., max(RSRP(r,m)). That is, the UE reports RSRP of a maximum of L number of antenna ports whose RSRP difference is higher than a certain threshold in an RSRP ratio or Db scale expression as follows.

$$RSRP(r,m) - \max(RSRP(r,m)) > \text{Threshold} \quad \text{[Equation 3]}$$

In another example, the UE may be designated a reference antenna port. It is desirable to designate an antenna port of the RRM-RS to be transmitted by the serving cell having a similar beam direction to a precoded CSI-RS configured to the corresponding UE as a reference antenna port. When the (m_0)th antenna port of the (r_0)th RRM-RS is designated as a reference antenna port, the UE reports when an RSRP of the other antenna port, compared with the RSRP of the reference antenna port, is within a certain difference. In other words, the UE reports when a difference in the RSRP exceeds a certain threshold value in an RSRP ratio or dB scale expression.

$$RSRP(r,m) - RSRP(r\_0,m\_0) > \text{Threshold} \quad \text{[Equation 4]}$$

QCL Setup of RRM-RS

In case of transmitting RRM-RS in each cell, the UE may be designated setup of RRN-RSs transmitted by the serving cell and the neighboring cell. Through this, the UE measures a gain according to beamforming of the serving cell and a gain according to beamforming of the neighboring cell, reports the same to the network so that the measurement may be utilized as a criterion for handover. Since the RRM-RS is configured to have a very low transmission density, it may be insufficient for signal tracking purposes. Therefore, the tracking result is utilized to track a signal which is reliably received due to high density, representatively, the CRS, and detect an RRM-RS. That is, the result of tracking by the CRS of the serving cell is inappropriate to be used for the RRM-RS transmitted from the neighboring cell due to an error of an oscillator generating a carrier frequency of the serving cell and the neighboring cell. Therefore, the quasi co-located (QCL-ed) CRS (or a specific different RS such as a CSI-RS, etc.) to be used for detecting each RRM-RS is informed. The UE uses large-scale characteristics of a channel estimated from the QCL-ed CRS (or a specific different RS such as a CSI-RS, etc.) to detect an RRM-RS. Here, the large-scale characteristics of the channel include at least one of delay spread, Doppler spread, Doppler shift, average gain, and average delay.

ePDCCH (Enhanced PDCCH)

In the LTE-A system, an enhanced PDCCH (E-PDCCH) for transmitting a DL control signal as an additional resource is introduced in addition to the existing PDCCH.

Here, it is assumed that the E-PDCCH is transmitted after the PDCCH is transmitted, that is, when viewed in the time axis, in the existing PDSCH region as illustrated in FIG. 8.

Although it is illustrated in FIG. 8 that the E-PDCCH is transmitted using continuous frequency resources, this is merely an example, and the E-PDCCH may also be transmitted using discontinuous frequency resources for frequency diversity.

FIG. 8 is a diagram illustrating an example of a resource region of an E-PDCCH.

In detail, the enhanced PDCCH (EPDCCH) carries UE-specific signaling. The EPDCCH is located in a physical resource block (PRB) that is set to be UE-specific. In other words, as described above, the PDCCH may be transmitted in the front up to three OFDM symbols of a first slot in the subframe, but the EPDCCH may be transmitted in a resource region other than the PDCCH. A time (i.e., symbol) at which the EPDCCH in the subframe starts may be configured in the UE through higher layer signaling (e.g., RRC signaling, etc.).

The EPDCCH may carry a transport format, resource allocation and HARQ information related to a DL-SCH, a transport format, resource allocation and HARQ information related to a UL-SCH, and resource allocation information related to a SL-SCH (Sidelink Shared Channel), a PSCCH (Physical Sidelink Control Channel), and the like. Multiple EPDCCHs may be supported and the UE may monitor a set of EPCCHs.

The EPDCCH may be transmitted using one or more successive advanced CCEs (ECCEs), and the number of ECCEs per EPDCCH may be determined for each EPDCCH format.

Each ECCE may include a plurality of enhanced resource element groups (EREGs). EREG is used to define mapping of ECCEs to REs. 16 EREGs exist per PRB pair. All REs, excluding an RE carrying a DMRS in each PRB pair, are numbered from 0 to 15 in order in which a frequency increases and in order in which a next time increases.

The UE may monitor a plurality of EPDCCHs. For example, one or two EPDCCH sets may be configured in one PRB pair in which the UE monitors EPDCCH transmission.

Different coding rates may be realized for the EPCCH by merging different numbers of ECCEs. The EPCCH may use localized transmission or distributed transmission, and accordingly, mapping of the ECCEs to REs within the PRB may vary Uplink-Downlink Frame Timing FIG. 9 is a diagram illustrating an example of an uplink-downlink timing relation.

Transmission of ith uplink radio frame from the UE starts $(N_{TA}+N_{TAoffset})*T_s$ seconds before the start of a corresponding downlink radio frame at the corresponding UE.

In $0 \le N_{TA} \le 20512$, $N_{TA\ offset}$ for a frame structure type 1 is $N_{TAoffset}=0$, and $N_{TA\ offset}$ for a frame structure type 2 is $N_{TAoffset}=624$.

It may not be transmitted in all slots of the radio frame. For example, in the case of TDD, transmission may occur only in a subset of slots within one radio frame.

NB (Narrow Band)-LTE System

The NB-LTE system refers to a system for transmitting and receiving signals using a narrow band of about 200 KHz (1 RB) in order to support terminals (for example, MTC UEs) that transmit small data at a low speed.

The NB-LTE system may also be expressed as an NB-IoT (Internet of Things) system, or the like.

The narrow band may be 200 KHz when a guard band is included, and may be 180 KHz when the guard band is not included.

The 1 RB represents a resource block in the LTE system. For reference, a spectrum of GSM/GPRS corresponds to 200 KHz.

The NB-LTE system, which will be described hereinafter with reference to FIG. 12, may be classified as an in-band mode and a guard-band mode operable in a carrier of the LTE(-A) system and a stand-alone mode, not operable in a carrier of the LTE(-A) system.

The MTC UE operating in the NB-LTE system is generally rarely mobile and features that it transmits small data insensitive to time delay.

Therefore, the MTC UE must have low complexity in manufacturing and battery life should be maintained for at least 10 years.

In addition, a minimum carrier spacing that may be transmitted in the NB-LTE system may be 15 kHz in the downlink and 3.75 kHz or 15 kHz in the uplink.

Also, in the NB-LTE system, since a signal must be transmitted and received within 1 RB, it may be necessary to redesign a synchronization signal transmitted in the 6 RB of the LTE system.

Transmission of Synchronization Signal (or Synchronization Sequence) in NB-LTE

In the NB-LTE system, a channel for transmitting a synchronization signal or a synchronization sequence is assumed to be an M-PSCH (Physical Synchronization Channel).

In this case, in the NB-LTE system, the M-PSCH may be used for adjusting time and frequency synchronization with a network, as well as for securing an accurate cell ID (Identification or Identity).

An example of a structure of a cell synchronization sequence used in the NB LTE is illustrated in FIG. 10.

FIG. 10 is a diagram illustrating an example of a frame structure for transmitting synchronization signals (PSS and SSS).

Referring to FIG. 10, a primary synchronization sequence (PSS) in NB-LTE may use three PSSs as in the LTE system to determine three cell identities in a group In order to distinguish between the PSS and the SSS in the LTE system, the PSS and the SSS used in the NB-LTE system will be referred to as an NB-PSS (or NPSS) and an NB-SSS (or NSSS), respectively, for the sake of convenience.

The NB-PSS has 6 OFDM symbol intervals and may be used to determine subframe timing as well as accurate frequency offset. Here, the NB-PSS may be continuously transmitted in the time domain. That is, the NB-PSS may be transmitted through multiple symbols.

The SSS (Secondary Synchronization Sequence) in the NB LTE, that is, the NB-SSS, may be used to determine a cell identity group and an M-frame timing with six OFDM symbol intervals.

In order to support the same cell identity groups as in the LTE system, 168 different SSSs are designed.

From the design of a synchronization signal, the NB-PSS and the NB-SSS may be repeatedly transmitted four times in every 15 ms within an M-frame of 60 ms.

In particular, the synchronization signal in the NB-LTE system exists in the third subframes of the second and seventh M-subframes and in the sixth subframes of the fourth and ninth M-subframes.

In the subframes including the synchronization signal (or synchronization sequence) in the NB-LTE system, the NB-PSS occupies the last six OFDM symbols and the NB-SSS occupies the second to seventh OFDM symbols Except that the NB-PSS and NB-SSS are repeated four times in the M-frame, while PSS and SSS in an LTE system are repeated twice in one radio frame, the design of the synchronization signal of the NB-LTE system is almost similar to the case of designing a synchronization signal in the LTE system.

This is because both PSS and SSS contain 72 subcarriers in both systems.

In the NB-LTE system, one OFDM symbol includes 12 subcarriers.

Therefore, due to the NB-PSS and the NB-SSS which are repeated four times in the NB-LTE system, the method for the NB-SSS to obtain the M-frame timing may be slightly modified.

A next system of the LTE-A system is considered to constitute a low-cost/low-specification terminal mainly focusing on data communication such as meter reading, water level measurement, utilization of a surveillance camera, and inventory report of a vending machine, and the like.

Such a low-cost/low-specification terminal will be referred to as an "MTC (Machine Type Communication) terminal" for the sake of convenience.

The MTC UE features that a data transmission amount is small and uplink/downlink data transmission/reception occurs occasionally.

Thus, it is necessary to lower manufacturing cost of the MTC UE and to reduce battery consumption in accordance with a low data rate of the MTC UE.

Furthermore, the MTC UE features that a channel environment is rarely changed because of low mobility.

Currently, the LTE-A system considers that the MTC UE is to have a wider coverage than the existing MTC UE, and to this end, various coverage enhancement (CE) techniques for the MTC UE are under discussion.

In a method for lowering manufacturing cost of the MTC UE, the MTC UE may operate irrespective of a cell operating system bandwidth, e.g., in a downlink and uplink bandwidth of less than 1.4 MHz.

FIG. 11 is a diagram illustrating an example of a system band in which the MTC UE to which the method proposed herein may be applied operates.

FIG. 11A illustrates a case where one subband is configured for the MTC UE, and FIG. 11B illustrates a case where a plurality of subbands are configured for the MTC UE.

As illustrated in FIG. 11A, a subband region in which the MTC UE operates may be configured to be always located in a central region (e.g., central 6 PRBs) of a cell.

Alternatively, as illustrated in FIG. 11B, considering multiplexing within a subframe between MTC UEs, a plurality of subbands for the MTC UE may be configured in one subframe.

Accordingly, MTC UEs may use different subbands in one subframe or use the same subband in one subframe, but different subbands other than the central 6 PRB region may also be used.

In this case, the MTC UE cannot properly receive a legacy PDCCH transmitted through the entire system band.

Also, it may be undesirable that the PDCCH for the MTC UE is transmitted in the OFDM symbol region in which the legacy PDCCH is transmitted due to a multiplexing issue with the PDCCH transmitted to another MTC UE.

As a method for solving this problem, a control channel transmitted to the MTC UE in at least one subband in which the MTC operates may be newly defined.

As described above, the downlink control channel newly defined for the MTC UE may be configured using the EPDCCH in the existing LTE-A system as is or the PDCCH/EPDCCH in the existing LTE-A system may be deformed to be defined.

In this disclosure, a physical downlink control channel newly defined for a low-complexity MTC UE or an MTC UE of normal complexity will be referred to as an "M-PDCCH'.

The 'MTC-EPDCCH' used in this disclosure may be interpreted to have the same meaning as 'M-PDCCH'

In order to further lower a unit price of the MTC UE, it is possible to consider an environment in which the MTC UE may operate using a narrow bandwidth of about 200 KHz.

In this environment, the MTC UE operates in a backward compatible manner in a legacy cell having a bandwidth wider than 200 KHz (in-band system or guard-band system) or a system may be deployed only for the MTC UE in a clean frequency band in which there is no legacy cell (stand-alone system).

FIG. 12 is a diagram illustrating an example of an operating system of an NB LTE system to which the method proposed in the present disclosure may be applied.

Specifically, FIG. 12A illustrates an in-band system, FIG. 12B illustrates a guard-band system, and FIG. 12C illustrates a stand-alone system.

The in-band system may be expressed as an in-band mode, the guard-band system may be expressed as a guard-band mode, and the stand-alone system may be expressed as a stand-alone mode.

The in-band system illustrated in FIG. 12A refers to a system or a mode in which a specific 1 RB in the legacy LTE band is used for NB-LTE (or LTE-NB). This system may be operated by allocating some resource blocks of an LTE system carrier.

The guard-band system of FIG. 12B refers to a system or a mode using NB-LTE is used in a space reserved for a guard band of a legacy LTE band. The guard-band system may be operated by allocating a guard-band of an LTE carrier which is not used as an RB in the LTE system.

The legacy LTE band has a guard-band of at least 100 KHz at the end of each LTE band In order to use 200 KHz, two non-contiguous guard-bands may be used.

The in-band system and the guard-band system have a structure in which NB-LTE coexists within a legacy LTE band.

In contrast, the stand-alone system of FIG. 12C refers to a system or a mode independently configured from the legacy LTE band and may be operated by separately allocating a frequency band (GSM carrier re-assigned later) used in the GERAN.

Hereinafter, a method of configuring synchronization signals (PSS and SSS) for effective cyclic prefix (CP) length detection when an MTC UE proposed in the present disclosure operates within a narrow band of about 200 KHz will be described with reference to the related drawings.

The synchronization signal configuring method proposed in this disclosure may be applied to all the in-band system, the guard-band system, and the stand-alone system.

Hereinafter, for convenience of description, contents of the present invention will be described based on an assumption of an environment in which a MTC UE operates in a system (stand-alone system) deployed only for an MTC operation When the MTC UE operates through a narrow bandwidth (e.g., 200 kHz), that is, when the MTC UE operates in the NB-LTE system, the system in which the MTC UE operates may use a subcarrier spacing, PRB size, sample length, slot/subframe length, and the like, defined in the current LTE system as is or may modify some of them to use.

In this case, the MTC UE may operate in a system having a bandwidth of 1 PRB (Physical Resource Block) (200 KHz: including guard bandwidth)/180 KHz: not including guard bandwidth).

As discussed above, the MTC UE may operate in the backwards compatible manner within a legacy cell having a bandwidth wider than 200 KHz, or a system may be deployed only for the MTC UE in a clean frequency band in which a legacy cell does not exist.

Hereinafter, a method and a frame structure for the MTC UE to transmit the NB-PSS and the NB-SSS in the NB-LTE system proposed in the present disclosure will be described Frame Structure in NB-LTE FIG. 13 is a diagram illustrating an example of a frame structure in the NB-LTE system proposed in the present disclosure.

That is, FIG. 13 illustrates a new frame structure in a system (NB-LTE system) in which the MTC UE operates through a narrow bandwidth.

Referring to FIG. 13, one M-frame 1310 has a length of 60 ms.

One M-frame includes 10 M-subframes, and one M-subframe 1320 has a length of 6 ms.

The one M-subframe includes six subframes. One subframe 1330 has a length of 1 ms and has the same structure as that of a legacy subframe in the LTE (-A) system.

That is, one subframe includes 14 symbols in the case of a normal CP and 12 symbols in the case of an extended CP Method for Transmitting PSS and SSS in NB-LTE Hereinafter, a method of transmitting a synchronization signal (PSS or SSS) in the NB LTE system using the frame structure of FIG. 13 will be described.

First Embodiment

The first embodiment shows a frame structure for transmission of a Primary Synchronization Signal (PSS) and a Secondary Synchronization Signal (SSS) in a stand-alone system.

As discussed above, the stand-alone system refers to a system in which a NB (Narrow Band)-LTE system considering 200 kHz operates without using the same frequency band as that of the legacy LTE system.

FIGS. 14 to 16 illustrate examples of a frame structure for transmission of a synchronization signal in the NB-LTE system proposed in the present disclosure.

That is, in the case of the NB-LTE system, a subframe may be configured to transmit a PSS and an SSS as illustrated in FIG. 14 to FIG. 16.

Here, since a PBCH (Physical Broadcast Channel) is transmitted to a 0th M-frame, it is assumed that the PSS and the SSS are not transmitted in the 0th M-frame.

Referring to FIG. 14, it can be seen that the synchronization signals (PSS and SSS) in the NB LTE system are configured to be transmitted in $0^{th}$ (first or second) subframes of #1 M-subframe (second M-subframe) and #6 M-subframe (seventh M-subframe) and in third (or fourth or fifth) subframes of #3 M-subframe (fourth M-subframe) and #8 M-subframe (ninth M-subframe).

Unlike FIG. 14, referring to FIG. 15, it can be seen that the PSS and the SSS are configured to be transmitted in third (or fourth or fifth) subframes of #1 M-subframe (second M-subframe) and #6 M-subframe (seventh M-subframe) and $0^{th}$ (or first or second) subframes of the #4 M-subframe (fifth M-subframe) and #9 M-subframe (tenth M-subframe).

Unlike FIGS. 14 and 15, referring to FIG. 16, the PSS and the SSS are configured to be transmitted in $0^{th}$ (or first or second) subframes of the #2 M-subframe (third M-subframe) and #7 M-subframe (eighth M-subframe) and third (or fourth or fifth) subframes of the #4 M-subframe (fifth M-subframe) and ninth M-subframe (tenth M-subframe).

FIG. 17 illustrates an example of a subframe structure in which a synchronization signal is transmitted in the frame structure of FIGS. 14 to 16.

In the case of FIG. 17, a subframe structure in which a PSS and an SSS are transmitted in a normal CP is illustrated.

When a subframe in which the SSS and the PSS are transmitted is configured using the frame structure illustrated in FIGS. 14 to 16, it may be configured such that the SSS and the PSS are transmitted in a specific subframe as illustrated in FIG. 17.

That is, in the 1 ms subframe, the SSS may be transmitted in six symbols (second to seventh symbols) of a first slot, and the PSS may be transmitted in six symbols (second to seventh symbols) of a second slot.

FIG. 18 illustrates symbols in which synchronization signals (PSS and SSS) according to each cyclic prefix (CP) are transmitted when the normal CP and the extended CP are used separately.

In detail, FIG. 18A illustrates symbols in which a synchronization signal is transmitted in the normal CP, and FIG. 18B illustrates symbols in which a synchronization signal is transmitted in the extended CP.

That is, FIG. 18 illustrates an example of a legacy subframe structure having the normal CP and the extended CP.

Here, when the subframes for the SSS and the PSS are configured as illustrated in FIGS. 18A and 18B, if the MTC UE does not know in advance whether the eNB uses the normal CP or the extended CP, the MTC UE may not accurately detect the PSS.

Therefore, as an example of a method for solving the problem, a subframe structure for transmitting the PSS as illustrated in FIG. 19 may be configured.

FIG. 19 is a diagram illustrating an example of a subframe structure for transmission of a synchronization signal in the NB-LTE system proposed in the present disclosure.

Specifically, FIG. 19A illustrates a new subframe structure for efficiently detecting a CP length by an MTC UE in the normal CP, and FIG. 19B illustrates a new subframe structure in the extended CP.

In order to transmit the SSS and the PSS through the subframe structure illustrated in FIG. 19, preferably, a subcarrier spacing of the NB-LTE/NB-CIoT system is set to have 2.5 kHz corresponding to ⅙ of a subcarrier spacing (15 kHz) of the legacy LTE system.

This is to use a synchronization signal sequence in the 6RB structure in the legacy LTE system.

That is, in the NB-LTE system, one symbol duration is $6 \times 2048 \times T_s = 400$ μs six times longer than a symbol duration $$2048 \times T_S = 66.67 \ \mu s \left( T_S = \frac{1}{2048 \times 15000} \right)$$

of the legacy LTE system.

In this case, since the number of subcarriers per resource block (RB) of a subframe in which the SSS and the PSS are transmitted is 72, the SSS and PSS sequences used in the 6 RB (12×6=72 subcarriers) of the legacy LTE system may be used as it is.

When a subframe structure as illustrated in FIG. 19 is configured, a PSS is transmitted during a new symbol duration (400 μs) from a subframe boundary. Therefore, the MTC UE may decode the PSS regardless of a CP length used by the eNB (configured with the corresponding MTC UE).

In order for the MTC UE to decode the SSS, the SSS may be detected based on two hypothesis.

The two hypothesis are (i) that the SSS is transmitted at a distance of one new normal CP length ($6 \times 144 \times T_s = 28.13$ μs) or (ii) that the SSS is transmitted at a distance of one new extended CP length ($6 \times 512 \times T_s = 100$ μs).

In this manner, the MTC UE may determine whether the eNB configured with the MTC UE uses the normal CP or the extended CP.

Meanwhile, when the eNB uses the normal CP, it may be configured to transmit the PSS and the SSS by empting two symbols of the legacy LTE system and two normal CPs ($2 \times 2048 \times T_s + 2 \times 160 \times T_s = 143.75$ μs) (1910) as illustrated in FIG. 19A.

In another embodiment, it may be configured such that a length of the normal CP 1920 located immediately before the SSS may be increased by 143.75 μs to define a new normal CP length to transmit the PSS and the SSS.

Second Embodiment

The second embodiment provides a frame structure for transmitting synchronization signals (PSS and SSS) in an in-band system of the NB-LTE system Assuming that the NB-LTE system considering 200 kHz operates using the same frequency band as that of the legacy LTE system (In-band system), it may be configured such that the synchronization signals (NB-PSS and NB-SSS) of the NB-LTE system are transmitted through the frame structure as illustrated in FIGS. 20 to 22, in order to prevent a degradation of performance of a PDCCH, a CRS (common reference signal), a synchronization signal, and the like, in the legacy LTE system.

FIGS. 20 to 22 illustrate other examples of a frame structure for transmission of a synchronization signal proposed in the present disclosure.

First, referring to FIG. 20, it can be seen that the synchronization signals (PSS and SSS) of the NB-LTE system are transmitted in $0^{th}$, first and second subframes of #1 and #6 M-subframes and in third, fourth, and fifth subframes of #3 and #8 M-subframes.

Unlike FIG. 20, referring to FIG. 21, it can be seen that the synchronization signals (PSS and SSS) are transmitted in third, fourth, and fifth subframes of #1 and #6 M-subframe and in $0^{th}$, first, and second subframes of #4 and #9 M-subframe.

Unlike FIGS. 20 and 21, referring to FIG. 22, it can be seen that the synchronization signals (PSS and SSS) are transmitted in $0^{th}$, first, and second subframes of #2 and #7 M-subframes and in third, fourth, and fifth subframes of #4 and #9 M-subframes.

FIG. 23 is a diagram illustrating an example of a subframe structure configured for transmitting a synchronization signal using the frame structure of FIGS. 20 to 22 in a normal CP.

That is, when subframes in which the synchronization signals (SSS and PSS) are transmitted are configured using the frame structures illustrated in FIGS. 20 to 22, it may be configured such that the PSS is transmitted in a slot boundary of each of the subframes and the SSS may be transmitted in a symbol immediately before the PSS as illustrated in FIG. 23.

When the PSS and the SSS are configured to be transmitted In the manner as that of FIG. 23, decoding of the PSS of the MTC UE may be performed independently of a CP length.

Also, the SSS transmitted in the symbol immediately before the PSS may be detected based on two hypothesis (transmitted at a distance by the normal CP length or transmitted at a distance by the extended CP length).

In this manner, the MTC UE may determine whether the eNB uses the normal CP or the extended CP.

Third Embodiment

The third embodiment provides a frame structure for transmitting synchronization signals (PSS and SSS) in an in-band system of the NB-LTE system.

A frame structure for transmitting the synchronization signals (PSS and SSS) in the NB-LTE system so as not to cause a degradation of performance of a PDCCH, a CRS, a synchronization signal, and the like, in the legacy LTE system when it is assumed that the NB-LTE system considering the 200 kHz is an in-band system using the same frequency band as that of the legacy LTE system, as in the second embodiment discussed above, will be described.

FIGS. 24 and 25 illustrate other examples of a frame structure for transmission of a synchronization signal proposed in the present disclosure.

Referring to FIG. 24, the PSS and the SSS in the NB-LTE system may be transmitted in #1, #3, #6, and #8 M-subframes of an M-frame.

Unlike FIG. 24, referring to FIG. 25, the PSS and the SSS in the NB-LTE system may be transmitted in #1, #4, #6, and #9 M-subframes of the M-frame.

FIG. 26 illustrates an example of the configuration of an M-subframe in which a synchronization signal is transmitted in the frame structure of FIGS. 24 and 25.

That is, when an M-subframe in which the PSS and the SSS are transmitted is configured using the methods illustrated in FIGS. 24 and 25, it may be configured such that the PSS is transmitted in each M-subframe boundary and the SSS is transmitted in a symbol immediately before the PSS.

Here, when the subframe is configured such that the PSS and the SSS are transmitted in the same manner as in FIG. 26, decoding of the PSS of the MTC UE may be performed independently of the CP length and the SSS transmitted in the symbol immediately before the PSS may be detected based on two hypothesis (transmitted at a distance by the normal CP length or transmitted at a distance by extended CP length).

That is, the MTC UE may determine whether the eNB uses the normal CP or the extended CP through this process.

The frame structure illustrated in FIG. 26 features that a duration between synchronization signals is not uniform.

Thus, when the MTC UE decodes a synchronization signal using several M-subframes, the PSS or the SSS may be detected using two hypothesis (synchronization signal is transmitted at a distance of one M-subframe or transmitted at a distance of two M-subframes).

FIG. 27 is a flowchart illustrating an example of a method of transmitting a synchronization signal in a system using a narrow band proposed in the present disclosure.

First, a UE receives broadcast information from a BS through a specific frame (S2710).

Here, the broadcast information may be transmitted to the UE through a physical broadcast channel (PBCH).

The specific frame is a frame defined for transmitting/receiving a signal in a narrow band (NB) and may correspond to the M-frame discussed above.

In addition, the specific frame may include at least one first subframe, and the first subframe may correspond to the M-subframe discussed above.

In addition, the first subframe includes at least one second subframe, and the second subframe may correspond to a subframe of the legacy LTE system.

That is, the second subframe includes 14 symbols in the normal CP and 12 symbols in the extended CP.

Here, the narrow band may be, for example, a frequency band of 200 KHz.

If the narrow band is 200 KHz, it may include a guard band. If the narrow band does not include the guard band, it may be 180 KHz.

The system using the narrow band may be a stand-alone system that does not use the same frequency band as that of the legacy LTE system, or an in-band system that uses the same frequency band as that of the legacy LTE system.

Thereafter, the UE receives a synchronization signal from the BS through one or more first subframes based on the received PBCH (S2720).

The synchronization signal includes a first synchronization signal and a second synchronization signal.

The first synchronization signal is a primary synchronization signal (PSS), and the second synchronization signal is a secondary synchronization signal (SSS).

Here, the step (S2720) of receiving the synchronization signal by the UE may include receiving the first synchronization signal through a first symbol set of the second subframe, and receiving the second synchronization signal through a second symbol set of the second subframe.

Here, the first symbol set and the second symbol set may each include at least one symbol.

The second symbol set may be located before the first symbol set.

Here, when the first symbol set and the second symbol set each include one symbol, they may have the subframe structure of FIG. 19.

In this case, the second subframe includes two normal CPs, one second symbol set, and one first symbol set.

In the case of following the subframe structure of FIG. 19, a symbol duration of the first symbol set is six times a symbol duration of the legacy LTE system, and a subcarrier spacing in the narrow band corresponds to ⅙ times a subcarrier spacing of the legacy LTE system.

In addition, the two normal CPs are located in front of the first symbol set and the second symbol set, respectively, and the second symbol set is located in front of the normal CP located in front of the first symbol set.

General Device to which Present Invention May be Applied

FIG. 28 is a block diagram of a wireless communication device according to an embodiment of the present invention.

Referring to FIG. 28, a wireless communication system includes a base station (BS) (or eNB) 2810 and a plurality of terminals (or UEs) 2820 located within coverage of the BS 2810.

The eNB 2810 includes a processor 2811, a memory 2812, and a radio frequency (RF) unit 2813. The processor 2811 implements functions, processes and/or methods proposed in FIGS. 1 through 27. Layers of radio interface protocols may be implemented by the processor 2811. The memory 2812 may be connected to the processor 2811 to store various types of information for driving the processor 2811. The RF unit 2813 may be connected to the processor 2811 to transmit and/or receive a wireless signal.

The UE 2820 includes a processor 2821, a memory 2822, and a radio frequency (RF) unit 2823. The processor 2821 implements functions, processes and/or methods proposed in above-described embodiments. Layers of radio interface protocols may be implemented by the processor 2821. The memory 2822 may be connected to the processor 2821 to store various types of information for driving the processor 2821. The RF unit 2823 may be connected to the processor 2821 to transmit and/or receive a wireless signal.

The memory 2812 or 2822 may be present within or outside of the processor 2811 or 2821 and may be connected to the processor 2811 or 2821 through various well known units. Also, the eNB 2810 and/or the UE 2820 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for transmitting a synchronization signal in a wireless communication system of the present invention has been described on the basis of the example applied to the 3GPP LTE/LTE-A system, but the present invention may also be applied to various other wireless communication systems (GSM, etc.), as well as to the 3GPP/LTE/LTE-A system.

The invention claimed is:

1. A method for transmitting and receiving a synchronization signal by a user equipment (UE) in a wireless communication system, the method comprising:
  receiving, from a base station (BS), broadcast information through a specific frame,
  wherein the specific frame is configured for transmitting and receiving a signal in a narrow band (NB),
  wherein the specific frame includes ten subframe sets,
  wherein each of the ten subframe sets includes six subframes, and
  wherein each of the six subframes includes at least one symbol; and
  receiving, from the BS, the synchronization signal through one or more subframe sets based on the broadcast information.

2. The method of claim 1, wherein the narrow band is a frequency band of 200 KHz.

3. The method of claim 2, wherein the narrow band includes a guard band.

4. The method of claim 1, wherein the synchronization signal includes a first synchronization signal and a second synchronization signal, and
  the receiving of the synchronization signal includes:
    receiving the first synchronization signal through a first symbol set of the subframe; and
    receiving the second synchronization signal through a second symbol set of the subframe.

5. The method of claim 4, wherein the second symbol set is located before the first symbol set.

6. The method of claim 4, wherein the narrow band does not use the same frequency band as that of a legacy LTE system.

7. The method of claim 4, wherein a symbol duration of the first symbol set is six times a symbol duration of the legacy LTE system.

8. The method of claim 7, wherein a subcarrier spacing in the narrow band is ⅙ times a subcarrier spacing of the legacy LTE system.

9. The method of claim 7, wherein the first symbol set and the second symbol set each include one symbol, and
the subframe includes two cyclic prefixes (CPs), one second symbol set, and one first symbol set.

10. The method of claim 9, wherein the two CPs are located before the first symbol set and the second symbol set, respectively, and
the second symbol set is located immediately before a CP located before the first symbol set.

11. The method of claim 9, wherein the subframe is empty by duration of two symbols and two normal CPs of the legacy LTE system.

12. The method of claim 1, wherein the broadcast information is transmitted through a subframe set of the specific frame.

13. The method of claim 1, wherein the subframe corresponds to a subframe of a legacy LTE system.

14. A user equipment (UE) for transmitting and receiving a synchronization signal in a wireless communication system, the UE comprising:
a transmitter and a receiver; and
a processor, operatively coupled to the transmitter and the receiver, the processor configured to:
receive broadcast information through a specific frame from a base station (BS),
wherein the specific frame is configured for transmitting and receiving a signal in a narrow band (NB),
wherein the specific frame includes ten subframe sets,
wherein each of the ten subframe sets includes six subframes,
wherein each of the six subframes includes at least one symbol; and
receive the synchronization signal from the BS through one or more subframe sets based on the broadcast information.

* * * * *